(12) United States Patent
Kram

(10) Patent No.: US 6,314,531 B1
(45) Date of Patent: Nov. 6, 2001

(54) METHOD AND SYSTEM FOR TESTING AND DEBUGGING DISTRIBUTED SOFTWARE SYSTEMS BY USING NETWORK EMULATION

(75) Inventor: Paul Regis Kram, Pittsburgh, PA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/163,211

(22) Filed: Sep. 29, 1998

(51) Int. Cl.[7] ........................................ H02H 3/05
(52) U.S. Cl. ................. 714/38; 379/10; 709/243
(58) Field of Search ................. 714/38, 12, 11; 379/10; 709/243

(56) References Cited

U.S. PATENT DOCUMENTS

| | | | |
|---|---|---|---|
| 5,438,528 | 8/1995 | Emerson et al. | 364/580 |
| 5,748,617 | 5/1998 | McClain, Jr. . | |
| 5,940,472 | * 8/1999 | Newman et al. | 379/1 |
| 5,987,521 | * 11/1999 | Arrowood et al. | 709/239 |
| 6,002,869 | * 12/1999 | Hinckley | 395/704 |
| 6,148,410 | * 11/2000 | Baskey et al. | 714/4 |

OTHER PUBLICATIONS

A Network Emulator to support the Development of Adaptive Applications; Authors: Nigel Davies, Gordon S. Blair, Keith Cheverst and Adrian Friday.

* cited by examiner

*Primary Examiner*—Robert Beausoleil
*Assistant Examiner*—Rita Ann Ziemer
(74) *Attorney, Agent, or Firm*—Jeanine S. Ray-Yarletts

(57) ABSTRACT

A method and system for emulating network latency, packet corruption, packet shuffling, packet loss and network congestion is introduced so that network connected multi-computer software systems can be tested and debugged in a cost effective and efficient manner. This network emulator requires no changes to the software being tested and requires only modifications to the MAC to IP mapping tables of the computers running the software to be tested. IT requires no modification to the communication stacks of the computers involved. The changes to these tables cause packets to be redirected to an emulator host computer where they can be delayed, deleted, corrupted or shuffled prior to delivery to their final destination.

6 Claims, 4 Drawing Sheets

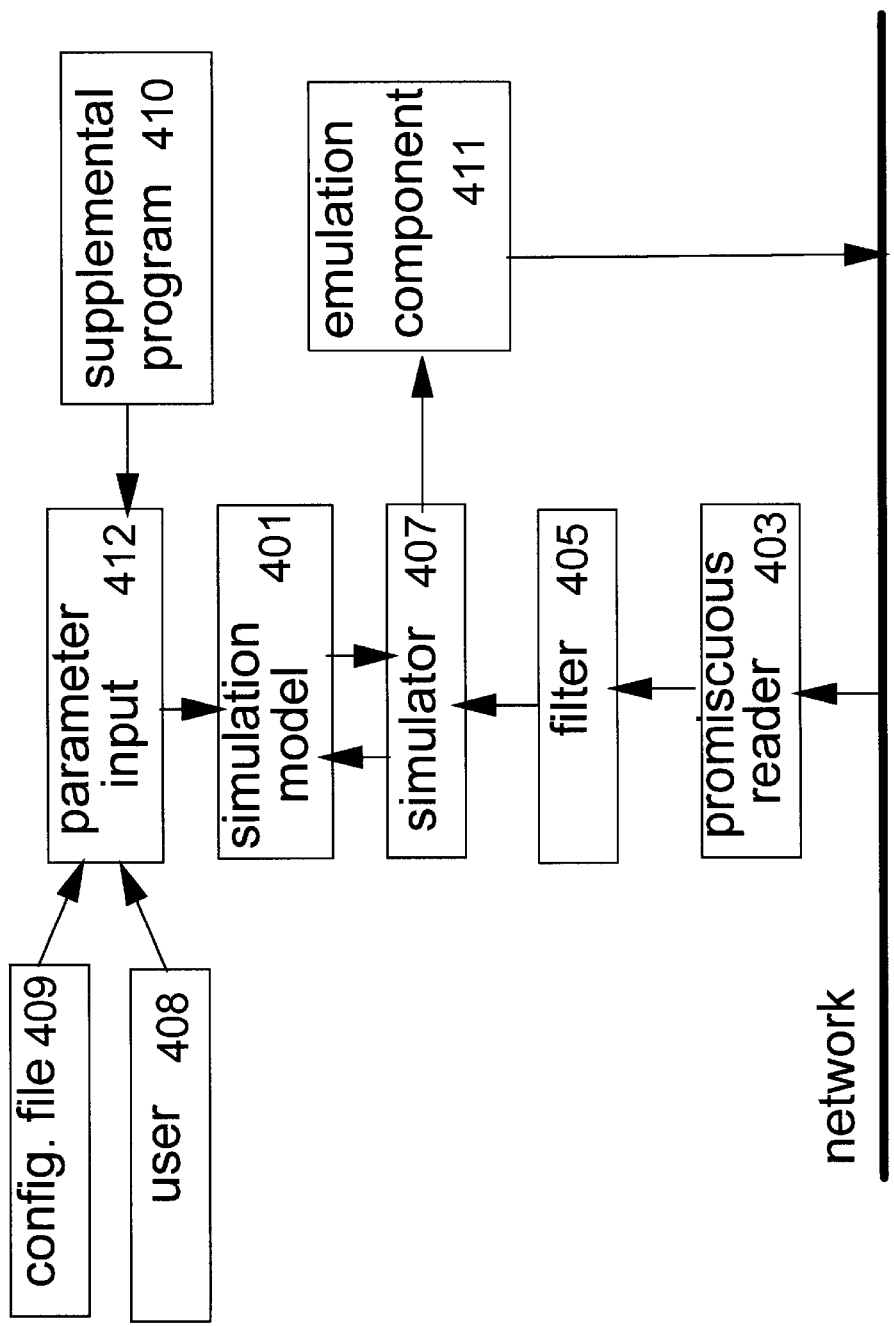

METHOD AND SYSTEM FOR TESTING AND DEBUGGING DISTRIBUTED SOFTWARE SYSTEMS BY USING NETWORK EMULATION

BACKGROUND OF THE INVENTION

With the growth of distributed enterprise computing comes the expensive task of testing and debugging software that is expected to run on large networks such as wide area networks or WANs. As competition between vendors increases and the critical role of software becomes more apparent, conflicting needs have arisen: those of (1) testing software more quickly thereby delivering products to the marketplace sooner and (2) testing software more comprehensively so as to insure consistently high quality. With the growth of distributed network computing, the specific need to test network connected multi-computer software systems in the presence of network failures and imperfect network properties has arisen. Testing and debugging on real multi-site networks, including those that span large geographic distances, is very expensive and has limited value due to the inherent discrepancies between a particular test network and the much broader range of network imperfections that will be encountered by the eventual users of the software. A single unaltered real test network cannot adequately represent the broad range of user networks. Also, due to the infrequency of several types of faults on real networks and the need to test the impact of such faults on a large number of product states, adequate testing confined to a real network becomes a very protracted, expensive, and often an impractical prospect. It is also difficult to debug network related software failures because the specific network behavior needed to reproduce the defect for debugging cannot be reproduced on demand on a real network.

Many types of networks exist from relatively fault-free LANs (Local Area Networks) to fault-rich Internet based WANs (Wide Area Networks). Software is normally tested on LANs located in test labs. The more error prone WAN end of the spectrum is fundamentally different from the LAN in that WANs have relatively high and variable latency. Many defects found in software ultimately result from timing problems hence it is very important to test software over a full range of network latency conditions. An additional characteristic of networks is that the delivery of packetized traffic is not guaranteed to be first-in, first-out (FIFO). On many networks successive packets may take routes of different lengths and thus arrive at their common destination out of order. Also, many networks do not guarantee delivery therefore delivery failures and dropped and corrupted packets for various reasons are not uncommon. Shuffled, dropped, and corrupted packets may be handled in the communications stack below the application level, but the communicating processes still see these events as erratic variations in network latency that may expose timing related defects in the software being tested. Real networks also suffer from persistent communication outages such that two or more computers lose the ability to communicate with each other for long periods of time.

Emulating a broader range of representative user networks with a greater than normal frequency of network faults makes it possible for developers of software to test products more throughly at lower cost and at an accelerated pace. In addition, network emulation makes it practical and efficient to optimally tune as well as measure the performance of software systems over various combinations of network latency and frequency of fault conditions. For example, networks with high latency and high packet loss rates. Further, network emulation allows the specific network behavior needed to reproduce a defect so that it can be debugged to be created on demand.

An ideal network free of imperfections would have zero latency and deliver all traffic in the order that it was sent. On real networks, latency varies erratically and can be very high. Latency is introduced by the distance that traffic must travel, the speed of the alternative routes available, and by the temporary buffering of traffic by the various pieces of routing hardware encountered along the way.

On some networks, traffic can arrive out of order and must be correctly reordered before the communication is presented to the application. The time taken to recover from out-of-order arrivals is seen by the software that reads the communication as transient increases in latency. In addition to transient communication outages, persistent communication outages of much longer duration can occur. Transient and persistent outages are often handle by different mechanisms in the software system and therefore network emulation must allow both conditions to be tested or reproduced for debugging purposes.

All of these imperfections are exaggerated and more pervasive on Internet based wide area networks, but they also occur on more localized networks.

Distributed enterprise computing involves multiple asynchronous processes, threads and multiple processors which provide the opportunity for creating software race conditions. Race conditions are by definition sensitive to timing of events and consequently to the erratic latency of imperfect networks. A race condition that resolves favorably in the presence of one degree of latency may resolve unfavorably under a different degree of latency. Race conditions present themselves when software transitions from one state to another. There are a very large numbers of state transitions in real world software applications and thus many opportunities for race conditions. It is the concurrence of a fault-vulnerable state transition with the latency-of-the-moment that reveals the underlying software defect. This underscores the importance of testing a large number of state transitions in combination with a broad range of latencies. Emulation of a range of specific latencies makes this a much more tractable task.

Besides latency, the other principle class of network faults is persistent communication outages. The software system must respond appropriately to the outage. Again, the large number of program state transitions comes into play because a communication outage could coincide with a transition. A program might correctly handle a communication outage at some but not all transitions. It is the concurrence of a fault-prone transition with a communication outage that reveals this underlying defect. This underscores the importance of testing a large number of state transitions in concurrence with communication outages. The frequency of communication outages on real networks is insufficient for testing purposes. Emulation allows a tester to increase the frequency of outages and thus accomplish the necessary testing in the available time or reproduce a defect for the purposes of debugging in a relatively short period of time.

Network emulation has been used in the past to test distributed software systems but has required some combination of modifications to the programs being tested, to the communication stack of the host sending or receiving the traffic, and to the contents of the packetized traffic. Such modifications are costly and make the system being tested different than the system delivered to users. This reduction of relevancy makes the testing less valuable. These modifications may also change the system in a significant way so that a defect cannot be reproduced for the purpose of debugging.

Other emulators, such as the Lancaster emulator described in "A Network Emulator to Support the Development of Adaptive Applications" written by Nigel Davies, Gordon S. Blair, Keith Cheverst and Adrian Friday and published in Proceedings of the 2nd Usenix Symposium on Mobile and Location independent Computing, Ann Arbor, Mich., U.S. on Apr. 10, 1995 are available in the industry, but they use some of the intrusive modifications mentioned above that significantly change the system being tested and raise cost.

Presently known emulators are intrusive because they change the programs that are being tested or the communications stack of the hosts on which they run thereby imposing a computational load on every participating host and consequently changing the timing of the distributed systems being tested. The present invention eliminates the need to make intrusive modifications and requires only a simple change to the table that maps the IP network addresses of hosts to MAC addresses of hosts and the turning off of the ARP (Address Resolution Protocol) mechanism that normally maintains this table. These configuration changes must be made on each computer that runs the software to be tested.

SUMMARY OF THE INVENTION

A method and apparatus have been created which run on a general purpose computer that has network interfaces to the same subnets as do the computers running the software to be tested or debugged. The method and apparatus of the present invention emulate, in a controlled manner, network latency, transient and persistent communications outages, and the loss or corruption of packets between the network connected computers running the distributed system software that is being tested or debugged. The amount of network latency can be a constant value, a periodically increasing or decreasing value, a function of the state of the software being tested, randomly variable within a range, or a function of the network congestion. The onset, duration and frequency of communication outages and packet corruption can be random, periodic, or synchronized with the state of the system tested or debugged. The values of these and other emulation parameters can further be changed as needed in real time by supplemental programs that communicate with the emulator or by way of a manual user interface.

In the preferred embodiment of the present invention, the parameters of the emulated network are defined in a configuration file so that the emulated network provides a real-world network environment in a predictable and repeatable manner. This facilitates the testing and debugging of software intended to run in a network environment.

BRIEF DESCRIPTION OF THE DRAWINGS

FIG. 4 depicts the interaction between components of the emulator software.

DETAILED DESCRIPTION OF THE PREFERRED EMBODIMENT

The preferred embodiment of the present invention is implemented using a single computer running an emulator program. This computer will be referred to as the emulator host, although in the preferred embodiment, it is not a traditional host such as an IBM System 390, but a workstation computer that is used. The emulator host has a directly connected network interface for each of the subnets that contain a test computer intends to use the emulated network. A test computer is a computer upon which the software to be tested is executing.

While the preferred embodiment is implemented using workstation computers, this is not meant to limit the invention in any way. It would be obvious to one skilled in the art that this invention could be implemented on any computer utilizing Internet Protocol as a communications mechanism and could be implemented as a combination of firmware and software if desired.

The network interfaces of the emulator's host are connected to network switches that are typically linked to a network backbone. In the preferred embodiment, the test machines that use the emulated network are physically connected to these same switches. If this is not possible, then connection to topologically proximate switches is an acceptable alternative, so as to minimize network bandwidth usage and maximize the accuracy of the emulation by minimizing the erratic delays that would be introduced by additional intermediate switching. A test computer can be connected to the physical subnet anywhere in the network, but the underlying physical network used by the emulator and test machines should be as localized and free of imperfections as possible to facilitate the most accurate network emulation. This allows imperfections to be introduced by the emulator in the most controlled and predictable fashion. Likewise, it is preferable that sufficient network bandwidth is available so that congestion related delays extraneous to the emulation are not introduced.

Figure 1:
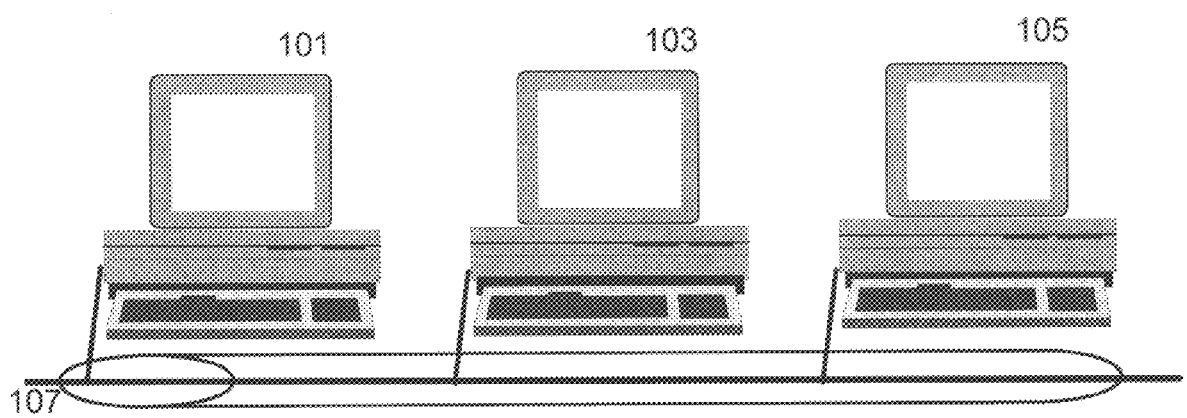
FIG. 1 depicts a simplified network in which the present invention may be embodied.

FIG. 1 depicts a simplified network and configuration of hosts in which the present invention may be implemented. Workstations 101 and 105 are two test computers which run the software being tested or debugged. Workstation 103 is a workstation running the emulation software (emulation host). All three of the workstations are connected through a network using a physical connection 107 such as a LAN. A more typical configuration would include additional test computers running software to be tested.

To implement the present invention the packets transmitted across the emulated test network must be redirected to the emulator host prior to being delivered to their ultimate destination. This is accomplished by altering the medium access control (MAC) addresses associated with the Internet Protocol (IP) addresses of the destination test computers on each of the source or sending test computers in the emulated test network and disabling the Address Resolution Protocol (ARP) updating function of the transmission protocol on those same source computers. This is different than ARP proxy techniques which are known in the art. The present invention requires disabling of the ARP for all participating test computers.

Figure 2:
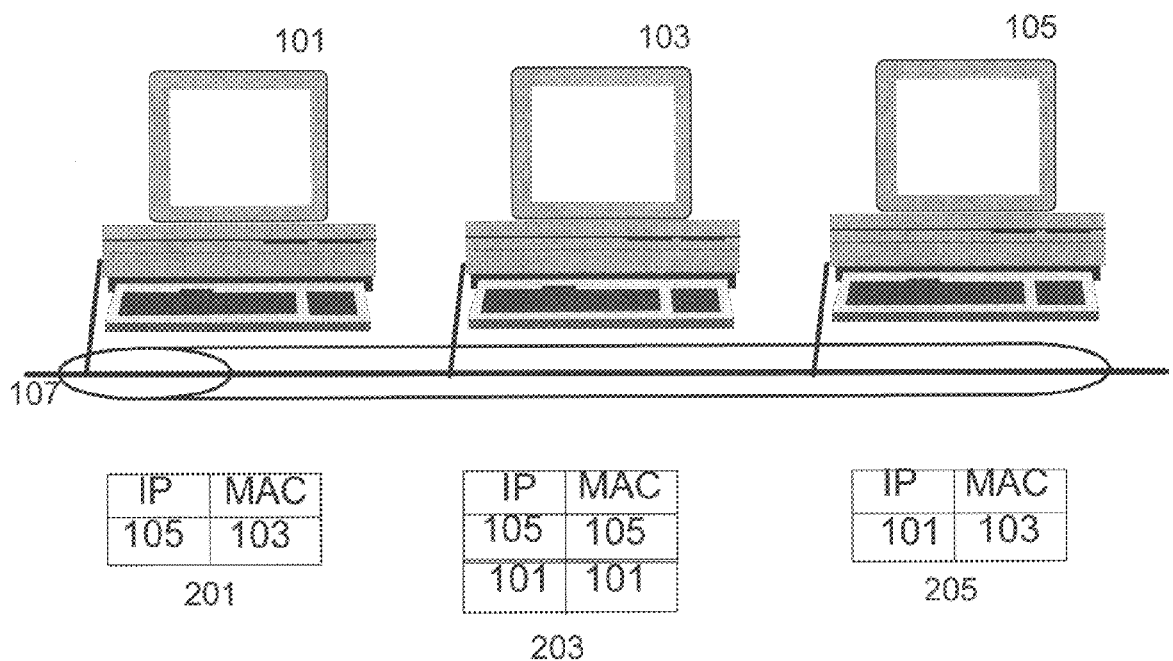
FIG. 2 depicts the modifications to the ARP table required to integrate the emulator into the simplified network of FIG. 1.

FIG. 2 depicts how the configuration of the IP address to MAC address tables must be changed to direct traffic to the emulation host 103 in this simplified configuration. The table at the workstation 101 is changed such that messages targeted for the computer having an IP (Internet Protocol) address of workstation 105 are redirected to the computer having a MAC (Medium Access Control) address of workstation 103. The table at the workstation 105 is changed such that messages targeted for the computer having an IP (Internet Protocol) address of workstation 101 are redirected to the computer having a MAC (Medium Access Control) address of workstation 103. A symmetric modification is made to table 201 for host 101. This is shown in tables 201 and 205. The IP address to MAC address tables are modified such that traffic intended to reach other test computers is first directed to the emulator host. The emulator correctly readdresses each packet and after a preprogrammed delay sends it on to the intended destination. The emulator may also inject faults such as dropped or corrupted packets The Address Resolution Protocol mechanisms must be disabled on each test machine otherwise they will update the ARP table with authentic MAC addresses and the traffic will no longer be directed to the emulator, thus defeating the purpose of the present invention.

By turning off the ARP mechanism the hosts running the software to be tested cease to respond to ARP requests. In the preferred embodiment, the emulator host becomes a publisher of the true MAC addresses of the hosts running the software to be tested such that extraneous hosts that continue to use the ARP protocol mechanism may continue to communicate with the hosts that are temporarily not responding to ARP requests. A machine with ARP mechanisms disabled cannot obtain MAC addresses automatically.

Hence the hosts running the software to be tested must contain static entries for the true MAC addresses of the extraneous hosts from the same subnet that may possibly need to communicate with them. A static entry for the ARP address of the default router must also be maintained on these hosts so that the test computers may continue to communicate with hosts outside of their subnet.

Turning off the ARP mechanism temporarily deprives the administrator of the test network of the convenience provided by the ARP protocol to automatically adapt to changes made to the IP addresses of the hosts running the software to be tested. Changing IP addresses of hosts is rare in most environments and should be strictly controlled in test environments, so this is a very small price to pay for the benefits of emulation. Changing the mapping of MAC to IP addresses on the hosts running the software to be tested does not impose computational load on those hosts during the test and thus it does not change the timing of the software system to be tested as do other intrusive emulation techniques. Turning off the ARP mechanism does remove the periodic computational load normally imposed by the ARP mechanism but this is generally beneficial to testing and debugging in that it makes behavior of the system less erratic. This computational load can be reintroduced in a controlled and predictable manner as needed by a supplemental program or the effect of the computational load can be reintroduced by the emulator.

Redirecting of the packets in the emulated network to the emulator host allows the emulator to delay delivery of each individual packet and thus introduce network latency in a controlled and predictable manner. The emulator can also deliberately corrupt or fail to deliver (drop) any specific packet or sequence of packets and thus introduce data corruption and network outages of various durations in a controlled and predictable manner. The emulator can also examine the source and destinations of each packet and take various actions based on that information. For example, the link between a particular pair of hosts can disconnect while all other links remain connected. Likewise different latency values may be introduced on a per link basis. The emulator has a real time global view of all of the traffic on the emulated network and thus it has the information needed to emulate various congestion scenarios by making delay and packet loss a function of congestion.

Figure 3:
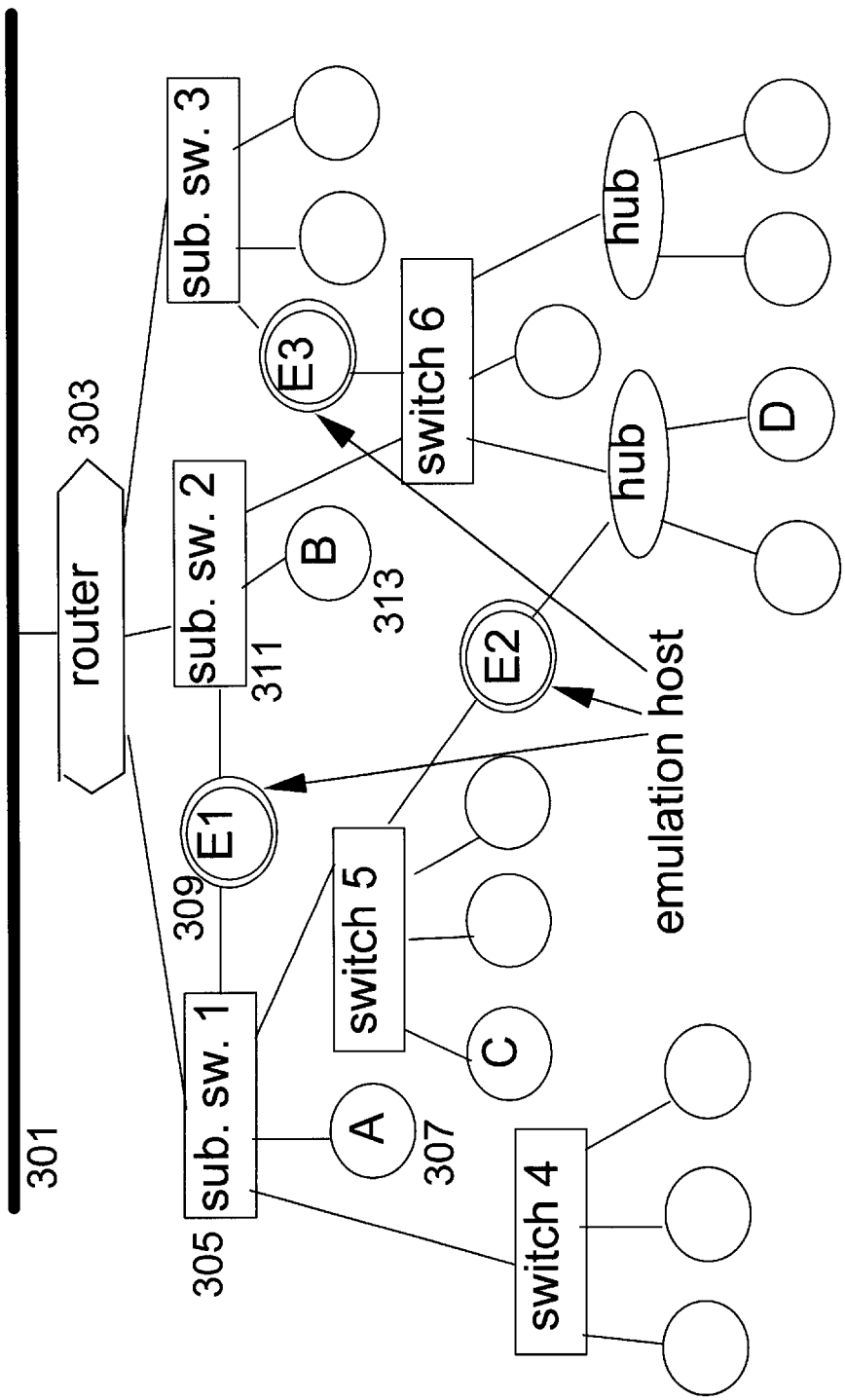
FIG. 3 depicts a tree structure representing a possible test network.

FIG. 3 depicts a sample layout of a test system and the connections within the network to be tested. In this sample layout a router 303 is connected to a backbone network 301. The router is then connected to several subnets, which in turn are connected to end nodes, hubs, and switches. Several possible positions for the emulator host are depicted (E1, E2, E3) in FIG. 3. The emulator host must be positioned such that it has a directly connected network interface to all subnets which contain test computers. The emulator host can be connected to any point in the physical network that implements the subnets but the emulation becomes a more parsimonious user of network bandwidth and more free of the unpredictable latencies and faults introduced by the real underlying network to the extent that the hosts running the software to be tested and the emulator host are proximate. That is, the hosts (the test computers and the emulator host) should be separated by the minimum amount of network hardware. The goal of network emulation is to introduce latency and other faults in a controlled and repeatable manner, localization of network topology allows the extraneous faults introduced by the underlying network to be minimized. The technique of manipulating MAC to IP address mapping only works within the scope of subnets because routers, which partition subnets, ignore MAC addresses and redirect traffic based on IP addresses.

FIG. 4 is a block diagram of the data flow between functional components of the emulator. A promiscuous reader 403 examines all packets seen by the directly connected network interfaces. It associates a time stamp of the arrival time of each packet with the respective packet. This reader is coupled to a filter 405 which filters out all packets not containing one of the MAC addresses of the emulator host. It also filters out all packets containing the IP address of the emulator host because these packets are destined to other processes on the emulator host. The filter passes on to the simulation component 407 all packets containing the MAC address of the emulator host and an IP address of one of the test computers.

The parameter input component 412 writes parameters to the simulation model component 401. These parameters are supplied by configuration files 408, manual user input 409, or supplemental external programs 410. The parameters are defined at system initialization and may be modified during the course of testing.

The simulation component 407 reads the source and destination IP addresses from the header of each packet, this information determines the link that the packet is traversing. The simulation component then reads the drop rate and the number of packets passed on the link since the last dropped packet from the emulation model, and whether the link is currently up or down. If the link is down (a persistent outage) the packet is discarded and no further processing takes place. If the link is up, the simulation component computes whether the packet should be dropped (because of a transient outage) and if so the packet is discarded.

If the packet is not to be dropped, the simulation component 407 reads the packet corruption rate from the simulation model and computes whether the packet should be corrupted. If so, the data or header of the packet is corrupted. In addition, the simulation component 407 reads various persistent network outage parameters from the simulation model and computes when various links should go up or down. The simulation component updates the current state of each link in the simulation model whenever a change of status (up/down) should occur. This simulation function may be augmented or superseded by supplementary programs or manual input that directly update the simulation model. Simulation functions that require real-time characteristics are preferably embodied in the emulator program itself rather than external supplemental programs.

If the packet is not to be corrupted or dropped, the simulation component 407 reads the base delay and available bandwidth associated with the link from the emulation model 409. It reads the size of each packet from the header of each packet. From this information it recomputes the available bandwidth and writes that information to the simulation model. It computes any additional congestion related delay, adds that to the base delay of the link and associates a total delay with the packet. The packet is then passed to the emulation component 411.

The emulation component 411 computes and associates with the packet a departure time based on the total delay of the packet and the original time stamped arrival time. The emulation component inserts each packet into a departure queue sorted by departure time. The emulation component monitors the current time and the scheduled departure time of the packet at the head of the queue. At the appropriate time, the emulation component writes the packet on a directly connected network interface. The emulation component also handles any necessary forwarding across subnets. Once the packet is written by the emulation component it contains the correct MAC address of the destination test computer.

What is claimed is:

1. A system for testing and debugging software by emulating communications networks, said system comprising:
    two or more test computers connected by said communications network each of said test computers having a corresponding medium access control (MAC) address and IP address, said test computers capable of sending and receiving packets, at least two of said test computers containing software to be tested;
    an emulation computer having a corresponding MAC address and one or more corresponding IP addresses, said emulation computer further comprising:
        a promiscuous reader for receiving packets from at least one computer in said communications network over a communications medium;
        a simulation model representing the condition of the network to be emulated;
        a simulator which receives input from said promiscuous reader and said model and assigns delay and deliberate faults to said packets based on information contained in said model; and
        an emulation component which writes the packets onto the communications medium at the time corresponding to the delay associated with the respective packet wherein the MAC address of each of said test computers is replaced by the MAC address corresponding to said emulation computer in all packets sent from each of said test computers onto said communications network.

2. A system as claimed in claim 1 wherein said emulation computer replaces the MAC address of the emulation computer with the MAC address corresponding to the IP address of the destination in said packets prior to said emulation component writing the packet onto the communications medium.

3. A method for testing and debugging software by emulating faults in a communications network having two or more test computers connected by said communications network each of said test computers having a corresponding medium access control (MAC) address and IP address, said test computers capable of sending and receiving packets, at least two of said test computers containing software to be tested and an emulation computer having a corresponding MAC address and one or more corresponding IP addresses, said method comprising the steps of:
    receiving packets from at least one computer in said communications network over a communications medium by a promiscuous reader at said emulation computer;
    receiving, at a simulator, input from said promiscuous reader and a simulation model and assigning delays and deliberate faults to said packets based on information contained in said simulation model; and
    writing, by an emulation component at said emulation computer, the packets onto the communications medium at the time corresponding to the delay associated with the respective packet wherein the MAC address of each of said test computers is replaced by the MAC address of said emulation computer in all packets sent from each of said test computers onto said communications network.

4. A method as claimed in claim 3 wherein said emulation computer replaces the MAC address of the emulation computer with the MAC address corresponding to the IP address of the destination in said packets prior to said emulation component writing the packet onto the communications medium.

5. A computer program product residing on a programmable medium embodying a programmed method for testing and debugging software by emulating faults in a communications network having two or more test computers connected by said communications network each of said test computers having a corresponding medium access control (MAC) address and IP address, said test computers capable of sending and receiving packets, at least two of said test computers containing software to be tested and an emulation computer having a corresponding MAC address and one or more corresponding IP addresses, said method comprising the steps of:
    programmably receiving packets from at least one computer in said communications network over a communications medium by a promiscuous reader at said emulation computer;
    programmably receiving, at a simulator, input from said promiscuous reader and a simulation model and assigning delays and deliberate faults to said packets based on information contained in said simulation model; and
    programmably writing, by an emulation component at said emulation computer, the packets onto the communications medium at the time corresponding to the delay associated with the respective packet wherein the MAC address of each of said test computers is replaced by the MAC address corresponding to said emulation computer in all packets sent from each of said test computers onto said communications network.

6. A program product as claimed in claim 5 wherein said emulation computer replaces the MAC address of the emulation computer with the MAC address corresponding to the IP address of the destination in said packets prior to said emulation component writing the packet onto the communications medium.

* * * * *